Patented Feb. 16, 1937

2,071,027

UNITED STATES PATENT OFFICE 2,071,027

WAX POLISH

Edward Newton Dacus and Benjamin Gallsworthy, Glenham, N. Y., assignors to The Texas Company, New York, N. Y., a corporation of Delaware No Drawing. Application August 3, 1934,
Serial No. 738,296

3 Claims. (Cl. 134—24)

This invention relates to wax polishing compositions, and more particularly to a solid wax polish containing carnauba wax and adapted for use on automobile bodies and the like.

Polishes containing carnauba wax have been widely used. Such polishes are generally made by dissolving the wax in a solvent or thinner, thus forming a liquid solution. In view of the fact that carnauba wax is very hard and brittle, it has heretofore been customary to employ adulterating waxes, such as paraffin wax, ozocerite and the like, along with the carnauba wax. However, polishes containing the mixed waxes do not give a finish having the durability and permanence of unadulterated carnauba wax prepared in accordance with the present invention. Moreover, liquid solution polishes have a practical limit of wax content, which is that amount which will remain in solution at ordinary temperatures in the solvent employed. Straight solutions of carnauba wax in a solvent in sufficient quantities to form a solid mix when cold, become granular due to the crystalline structure of carnauba wax, thereby rendering the granular mix extremely difficult to apply evenly. In order to overcome this objection, it has been proposed to incorporate higher proportions of carnauba wax by mechanically comminuting the wax in the solvent in the cold, thereby forming a liquid suspension. Such material is hard to apply, requiring considerable rubbing in order to disperse and spread the crystalline particles or lumps of wax over the surface being finished.

It has also been proposed to emulsify various waxes, including carnauba wax, with water and petroleum oils to produce liquid emulsions. However, such liquid emulsions are necessarily quite dilute in wax content, and generally result in the application of only a thin wax film upon the surface being finished, which film is noncumulative upon successive applications.

In accordance with the present invention, a wax polish containing a comparatively high proportion of unadulterated carnauba wax is prepared in a form which renders its application more convenient and easy, while at the same time giving a film of superior durability and permanence, the film being cumulative upon successive applications. This is accomplished by producing a solid emulsion of the carnauba wax in water and a petroleum thinner with an emulsifying agent.

In preparing the polish of the present invention, the carnauba wax is admixed in sufficient proportion to give ultimately a solid product with water, a suitable thinner such as kerosene, and an emulsifying agent such as ammonium linoleate. The mixture is subjected to heat to raise the temperature above the fusion point thereof, while being agitated at high speed, as by a conventional motor driven high speed stirrer, preferably of the propeller type. The agitation disperses the wax in the water and petroleum thinner so that an emulsion is obtained which is of sufficient permanence to avoid breaking until the material has set into a solid. The heated emulsion, while still in liquid form, is drawn off into cans or molds above the fusion temperature of the mixture, and then allowed to cool and set into a solid emulsion.

When prepared in accordance with the present invention, an undulterated carnauba wax is found to give a superior finish, contrary to previous belief and practice in which the wax has generally been tempered by the adulteration of lower melting point waxes to overcome the hardness and brittleness of the carnauba wax.

The thinner employed in the present invention is one which has a controlled boiling range to give rapid drying of the film upon exposure to air. Petroleum thinners are preferred, although other types of solvents such as turpentine may be used. Very satisfactory results have been secured with a refined narrow cut kerosene having an initial boiling point not under about 320° F. and an end boiling point not over about 460° F. However, petroleum thinners of wider distillation ranges may be used, although in that event the polish requires more effort to apply.

Any suitable emulsifying agent may be used, such as the customary non-greasy soaps, bentonite clay and the like. Very satisfactory results have been secured with ammonium linoleate. A small amount of dye may be incorporated in the polish to give it the desired color.

As a specific example of a polish prepared in accordance with the present invention, the following is given:

| | Percent by weight |
|---|---|
| Carnauba wax | 12.50 |
| Ammonium linoleate | 0.75 |
| Water | 36.72 |
| Petroleum thinner | 50.00 |
| Dye | 0.03 |

In the preparation of a wax of the above formula, the mixture is agitated at high speed at a temperature above about 140°–146° F., which constitutes the fusion point thereof. The fusion point may be readily determined for different proportions and compositions, and the emulsion formed at temperatures somewhat in excess of the fusion point, such for example as about 10°–20° F. or more above the fusion point.

The ingredients in the above formula can be varied within comparatively wide limits, particularly the proportions of water and thinner. Ordinarily, a proportion by weight of about 10–15% carnauba wax, 30–50% water, and 60–35% kerosene is employed. Only a small proportion of an emulsifying agent is required, generally under 1% by weight.

Obviously many modifications and variations of the invention, as hereinbefore set forth, may be made without departing from the spirit and scope thereof, and therefore only such limitations should be imposed as are indicated in the appended claims.

We claim:

1. A solid emulsion wax polish consisting essentially by weight of about 10–15% carnauba wax, 30–50% water, 60–35% kerosene, and a small proportion of an emulsifying agent.

2. A solid emulsion wax polish consisting essentially by weight of about 10–15% carnauba wax, 30–50% water, 60–35% of a narrow cut kerosene having an initial boiling point not lower than 320° F. and an end boiling point not above 460° F., and a small proportion of an emulsifying agent.

3. A solid emulsion wax polish consisting essentially by weight of the following ingredients in about the proportions stated:

| | Percent by weight |
|---|---|
| Carnauba wax | 12.50 |
| Ammonium linoleate | 0.75 |
| Water | 36.72 |
| Petroleum thinner | 50.00 |
| Dye | 0.03 |

EDWARD NEWTON DACUS.
BENJAMIN GALLSWORTHY.